United States Patent [19]

Taira

[11] 4,384,200
[45] May 17, 1983

[54] APPARATUS FOR CHANGING ILLUMINATION OPTICS OF A MICROSCOPE

[75] Inventor: Akio Taira, Hachioji, Japan
[73] Assignee: Olympus Optical Company Ltd., Japan
[21] Appl. No.: 240,950
[22] Filed: Mar. 5, 1981
[30] Foreign Application Priority Data
Jun. 13, 1980 [JP] Japan .................................. 55-79841
[51] Int. Cl.³ .............................................. G01J 1/32
[52] U.S. Cl. .................................... 250/205; 350/526
[58] Field of Search ....................... 250/201, 205, 216; 356/218, 224, 225; 350/523-528

[56] References Cited
U.S. PATENT DOCUMENTS
4,163,150  7/1979  Stankewitz .......................... 250/205
4,241,251  12/1980  Yonekubo ........................... 350/526

Primary Examiner—David C. Nelms
Attorney, Agent, or Firm—Ostrolenk, Faber, Gerb & Soffen

[57] ABSTRACT

An apparatus for changing illumination optics is provided for use in a microscope including a plurality of illumination optics having different values of magnification. A photometric, light receiving element is disposed in a marginal area of an imaging surface of an objective lens, and an output from the photometric element is determined as the illumination optics are sequentially changed. A matching condition between the objective lens and the illumination optics is detected in accordance with the value determined, and that one of illumination optics is selected which represents the best match.

9 Claims, 4 Drawing Figures

FIG. 1
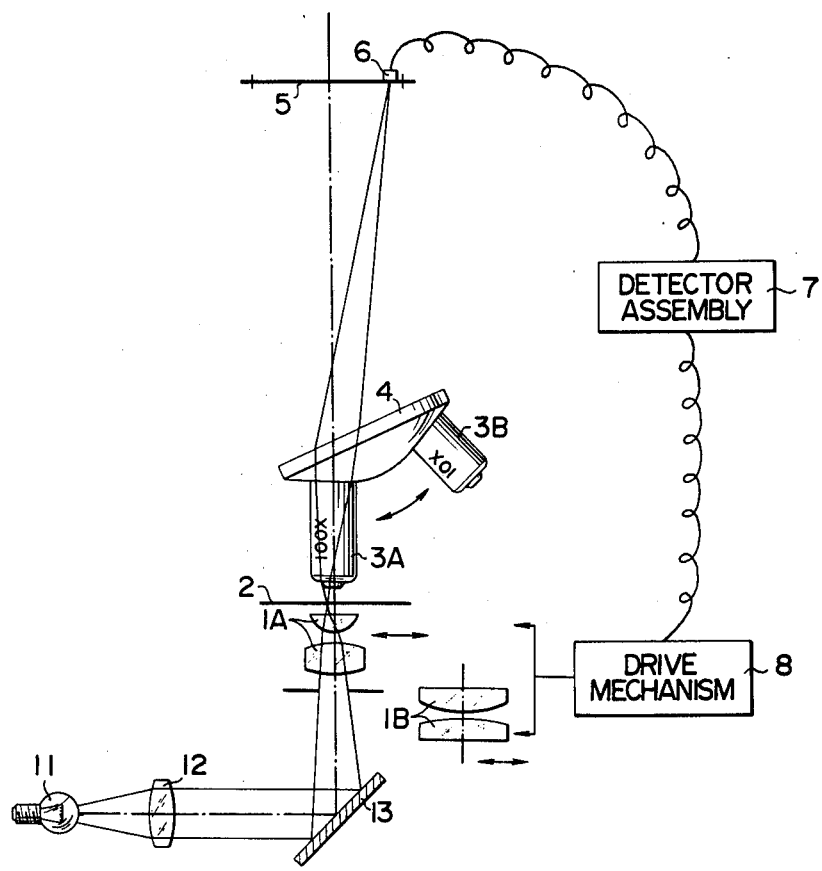
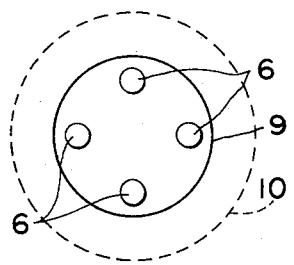
FIG. 2(A)
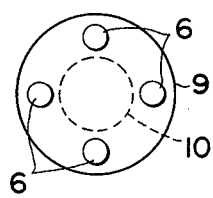
FIG. 2(B)
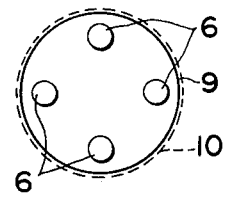
FIG. 2(C)

APPARATUS FOR CHANGING ILLUMINATION OPTICS OF A MICROSCOPE

BACKGROUND OF THE INVENTION

The invention relates to an apparatus for changing illumination optics of a microscope, and more particularly, to such apparatus for use with a microscope including a plurality of objective lenses and a plurality of illumination optics lenses, both having different values of magnification, allowing illumination optics of the microscope to be changed so as to match a particular one of the objective lenses disposed in an observation optical path.

In a microscope of the kind described, a revolver may be disposed in an observation optical path to permit a plurality of objective lenses to be changed. An observer selects a particular one of illumination optics lens which matches the objective lens used, the selected illumination optics lens being disposed in an illumination optical path. This arrangement required a troublesome changing operation.

To eliminate such difficulty, an arrangement has been proposed in which the objective lenses or the revolver is provided with indicator elements which indicates the values of the magnification of the various objective lenses so that the indicator elements may be detected and discriminated when changing the objective lenses to permit an automatic changing of illumination optics lens which matches therewith. However, this arrangement requires the provision of a separate indicator element for each objective lens or each objective lens position on the revolver, and it is also necessary to assure an accurate discrimination of a particular indicator element corresponding to each value of magnification. This presented a problem in the design of the indicator elements.

SUMMARY OF THE INVENTION

It is an object of the invention to provide an apparatus for changing illumination optics of a microscope in which a photometric light receiving element is disposed in a marginal area of the location of an object image formed by one of objective lenses in order to produce an output which is utilized to select a particular one of illumination optics which matches the objective lens.

In accordance with the invention, a plurality of illumination optics lenses having different values of magnification are sequentially changed, with photometric outputs from the light receiving element being detected and stored for subsequent comparison among them to determine which photometric output has the maximum magnitude. The illumination optics lens which produced the maximum output is chosen for use with the particular objective lens as one which best matches the latter. Accordingly, it is unnecessary to provide separate indicator elements in association with individual objective lenses or lens positions on the revolver. The entire arrangement required comprises the photometric element disposed in a marginal area of an image field of the objective lens, a detector assembly which detects the output from the photometric element and stores it for comparison, and a drive mechanism for changing illumination optics lenses in response to a signal from the detector assembly. In this manner, there is provided an apparatus for changing illumination optics of a microscope which is convenient in practical use.

BRIEF DESCRIPTION OF THE DRAWINGS

FIG. 1 is a schematic view of an apparatus for changing the illumination optics of a microscope according to one embodiment of the invention; and FIGS. 2(A), (B) and (C) are plan views illustrating the relationship between the field of sight of the objective and lens, the field of illumination of illumination optics and the photometric elements.

DESCRIPTION OF PREFERRED EMBODIMENT

Referring to FIG. 1, there is shown a source of illumination light 11, which is introduced through a condenser lens 12 and a reflecting mirror 13 to pass through illumination optics lens 1A, which is disposed in an illuminating optical path, for illuminating a specimen 2. An object image of the illuminated specimen 2 is enlarged to a given magnification by means of an objective lens 3A disposed in an observation optical path to be focussed onto an imaging surface 5 for observation through an eyepiece assembly, not shown.

For the convenience of description, a plurality of objective lenses having different values of magnification are illustrated by a pair of objective lenses 3A, 3B in the present embodiment, the lens 3A being of a high magnification lens such as having a magnification of 100 and the lens 3B being a low magnification (for example, 10) lens. These objective lenses 3A, 3B are detachably mounted on a revolver 4, and can be selectively disposed in the observation optical path by turning the revolver 4. Illumination optics lenses having different values of magnification are also illustrated by a pair of lenses 1A and 1B, each having a high and a low value of magnification.

In accordance with the invention, at least one photometric, light receiving element 6 is disposed in a marginal area of the imaging surface 5, and its output is fed to a detector assembly 7. The detector assembly 7 may comprise, for example, a central processing unit including a memory and a comparator so that a photoelectric output from the element 6 is determined and stored. As the illumination optics lenses 1A, 1B are sequentially changed, the stored values are compared against each other to detect an output which exhibits the maximum value, and a corresponding signal is fed to a drive mechanism 8 which is utilized to change the illumination optics lenses. It is to be understood that the drive mechanism 8 is adapted to change the plurality of illumination optics lenses in a sequential manner when comparing outputs from the element 6. In response to the signal, the drive mechanism 8 drives that illumination optics lens which produced the maximum output into the illumination optical path.

In operation, it is initially assumed that an observation is being made by using the objective lens 3A of a high magnification. When the illumination optics lens 1A is used to illuminate the specimen 2, an enlarged object image is formed by the objective lens 3A. The brightness in the marginal area of the image is measured, by the photometric element 6, the photoelectric output of which is fed to the detector assembly 7, which detects and stores this output. Subsequently the illumination optics lens is changed to the lens 1B to illuminate the specimen 2, and an object image thereof is formed by the objective lens 3A. The brightness of this object image is measured by the photometric element 6, which feeds its output to the detector assembly 7, which then detects and stores it.

Both the stored values are compared against each other, with a maximum value being fed to the drive mechanism 8. In response to this output, the drive mechanism 8 brings the illumination optics lens which produced the maximum value, namely, the illumination optics lens 1A of the high magnification in the present example, into the illumination optical path.

When the objective lens is changed to the low magnification lens 3B, both the illumination optics lenses 1A, 1B are sequentially brought into the illumination optical path to illuminate the specimen, and the outputs from the photometric element 6 are compared against each other (in detector assembly 7) to determine which illumination optics lens produces the maximum output, i.e., the low magnification lens 1B in the present example. Accordingly, this illumination optics lens is brought into the illumination optical path.

In this manner, the illumination optics which best matches a particular objective lens used is automatically selected in accordance with the invention.

Considering the reason that the described procedure provides a selection of optimum illumination optics, it is to be understood that when the objective lens used has a high magnification (lens 3A) while the illumination optics lens disposed in the illumination optical path has a low magnification (lens 1B), the field of illumination of the low magnification optics is greater than that of the high magnification optics. Accordingly, the illuminating light impinges on the objective lens 3A over the full pupil thereof. However, since the low magnification optics has a numerical aperture which is substantially smaller than that of the high magnification optics, an insufficient amount of light is transmitted. Accordingly, the output from the photometric element 6 is low for the described combination.

In contrast, if the low magnification objective lens 3B is used in combination with the high magnification illumination optics lens 1A, the reverse is ture. In other words, the field of illumination is reduced as compared with that achieved by the low magnification optics lens. Accordingly, an image will be formed part of which is not illuminated when using the low magnification lens 3B. On the other hand, the high magnification optics lens has a greater numerical aperture and hence produces high brightness. Thus, the image formed by the objective lens 3B will be very bright only over its central portion while the marginal portion will be dark, wanting in light input. Accordingly, the photometric element 6 again produces an output of a low magnitude.

Finally for a combination of the high magnification lens 3A and the high magnification optics lens 1A or a combination of the low magnification objective lens 3B and low magnification optics lens 1B, both of which represents a best match, the field of sight of the objective lens coincides with the field of illumination of the illumination optics lens and the illumination optics lens has a numerical aperture which matches the numerical aperture of the objective lens, so that the entire object image formed by the objective lens is sufficiently bright. Consequently, such combination results in a maximum output from the photometric element 6.

These three alternative combinations are illustrated in FIGS. 2(A), (B) and (C) which schematically show the relationship of the field of sight, the field of illumination and the location of photometric elements. Specifically, FIG. 2(A) illustrates the use of the low magnification illumination optics in combination with the high magnification (100X) objective lens 3A. In this instance, the location of the photometric elements 6 which are disposed in a marginal area of the field of sight 9 of the objective lens 3A is within the field of illumination 10, but since the numerical aperture of the illumination optics is less than that of the high magnification objective lens 3A, the entire field of illumination remains relatively dark, causing the photometric elements 6 to produce an output of a low magnitude.

FIG. 2(B) illustrates the use of the high magnification illumination optics in combination with the low magnification (10X) objective lens 3B. In this instance, the photometric elements 6 are located outside the field of illumination 10, and hence the latter remains very dark. Consequently, they produce an output of a low magnitude.

By contrast, FIG. 2(C) illustrates a best match between the objective lens and the illumination optics. In this instance, the field of illumination 10 and the numerical aperture of the illumination optics are a good fit with the field of sight 9 and the numerical aperture of the objective lens, respectively, so that the location around the photometric elements 6 is sufficiently bright. Hence, they produce a maximum output.

It will be apparent from the foregoing that illumination optics which fits a particular objective lens used can be automatically selected by changing illumination optics against the objective lens used, storing individual outputs from the photometric element, and comparing these outputs against each other to determine illumination optics which produced the maximum output.

While the use of four photometric elements 6 is illustrated in FIGS. 2(A) to (C), it is to be understood that at least one photometric element need only be provided in the marginal area of the image. Nevertheless, the use of a plurality of photometric elements 6 disposed in the manner mentioned permits a detection of a non-uniformity in the illumination in accordance with the invention. Specifically, the individual outputs from the photometric elements may be determined under a condition without a specimen, and the centering of the light source may be adjusted so that outputs of the individual elements are equal to each other.

While the embodiment described represents a microscope including a pair of objective lenses of high and low magnifications for cooperation with a pair of illumination optics of high and low magnifications, it should be understood that the invention is not limited thereto, but is equally applicable to any microscope including a plurality of objective lenses having different values of magnification and a plurality of illumination optics having different values of magnification.

What is claimed is:

1. An apparatus for changing the illumination optics of a microscope which includes a plurality of objective lenses having different values of magnification and a plurality of illumination optics lenses having different values of magnification in which said illumination optics lenses are changed in respect to a particular one of said objective lenses which is disposed in an observation optical path of said microscope; the apparatus comprising:

at least one photometric, light receiving element disposed in a marginal area of an image field of that one of said objective lenses which is disposed in said observation optical path;

detecting means for determining an output from said photometric element as said illumination optics lenses are sequentially changed and for determining a matching condition between said objective lens disposed in said observation optical path and said illumination optics lenses in accordance with the magnitude of an output of said photometric element; and drive means responsive to an output from said detecting means for selecting that one of said illumination optics lenses which represents a best match with said objective lens disposed in said observation optical path and for bringing such illumination optics into cooperating position with the objective lens.

2. An apparatus according to claim 1 in which the photometric element provides a maximum output for that illumination optics lenses which represents the best match with said objective lens which is disposed in said observation optical path.

3. Apparatus for changing the illumination optics of a microscope of the type which includes a plurality of objective lenses adapted to be selectively brought into an observation optical path of said microscope and a plurality of illumination optics lenses adapted to be selectively brought into an illumination optical path of said microscope, said apparatus comprising:

(A) measuring means for measuring the magnitude of light located in a marginal area of an image field of that one of said objective lenses which is located in said observation optical path; and (B) control means for:
  (1) sequentially bringing each of said illumination optics lenses into said illumination optical path such that said measuring means measures the magnitude of light located in said marginal area for each of said illumination optics lenses;
  (2) determining which one of said illumination optics lenses best matches with said one of said objective lenses as a function of said measured magnitudes; and
  (3) moving said one of said illumination optics lenses into said illumination optical path.

4. Apparatus according to claim 3, wherein said measuring means comprises at least one photometric, light receiving element disposed in said marginal area of said image field.

5. The apparatus of claim 3, wherein said control means determines which of said illumination optics lenses best matches with said one of said objective lenses by comparing the magnitudes of light located in said marginal area for each of said illumination optics lenses.

6. The apparatus of claim 5, wherein said control means determines which one of said illumination optics lenses best matches with said one of said objective lenses by determining which of said illumination optics lenses produces the highest magnitude of light in said marginal area.

7. The apparatus of claim 6, wherein said measuring means generates output signals representative of the magnitude of light located in said marginal area and wherein said control means comprises:

a drive mechanism for selectively moving said illumination optics lenses into said illumination optical path as a function of control signals applied thereto; and detector assembly means receiving said output signals generated by said measuring means and for controlling the operation of said drive mechanism by generating said control signals.

8. A process for changing the illumination optics of a microscope of the type which includes a plurality of objective lenses adapted to be selectively brought into an observation optical path of said microscope and a plurality of illumination optics lenses adapted to be selectively brought into an illumination optical path of said microscope, said process comprising the steps of:

moving one of said objective lenses into said observation optical path;

sequentially bringing each of said illumination optics lenses into said illumination optical path such that the magnitude of light located in a marginal area of an image field of said one objective lens varies as a function of the illumination optics lens located in said illumination optical path;

measuring the magnitude of light located in said marginal area as each of said illumination optics lenses is brought into said illumination optical path;

determining which of said illumination optics lenses best matches with said one objective lens as a function of the magnitude of light located in said marginal area; and thereafter moving said one of said illumination optics lenses into said illumination optical path.

9. The process of claim 8, wherein said determining step determines said one of said illumination optics lenses by determining which of said illumination optics lenses causes the magnitude of light in said marginal areas to be the greatest.

* * * * *